(12) United States Patent
Nabe et al.

(10) Patent No.: US 7,605,363 B2
(45) Date of Patent: Oct. 20, 2009

(54) OPTICAL PICKUP UNIT INCLUDING A RECEIVING PORTION

(75) Inventors: Mitsuhiro Nabe, Gunma (JP); Hideyuki Kato, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/536,401

(22) Filed: Sep. 28, 2006

(65) Prior Publication Data
US 2007/0082419 A1 Apr. 12, 2007

(30) Foreign Application Priority Data
Sep. 30, 2005 (JP) ............................. 2005-287263

(51) Int. Cl.
*H01J 5/02* (2006.01)
(52) U.S. Cl. ..................... 250/239; 250/552; 369/120; 369/121
(58) Field of Classification Search ................. 250/239, 250/552; 369/120, 121, 112.01, 112.05, 369/112.28
See application file for complete search history.

(56) References Cited

U.S. PATENT DOCUMENTS

| 6,239,427 B1* | 5/2001 | Mizue ........................ 250/239 |
| 2004/0047273 A1 | 3/2004 | Kitano | |
| 2004/0136310 A1* | 7/2004 | Park et al. ................... 369/121 |

FOREIGN PATENT DOCUMENTS

| CN | 1469353 A | 1/2004 |
| JP | 2005-141821 | 6/2005 |

OTHER PUBLICATIONS

Office Action from Chinese Patent Application No. 200610141429.8 dated Oct. 17, 2008 with English Translation.

* cited by examiner

*Primary Examiner*—Seung C Sohn
(74) *Attorney, Agent, or Firm*—Fish & Richardson P.C.

(57) ABSTRACT

An optical pickup unit comprising: a circuit connected to a light emitting device emitting light; and a counterpart circuit connected to the circuit, the circuit being soldered to the counterpart circuit.

6 Claims, 11 Drawing Sheets

OPTICAL PICKUP UNIT INCLUDING A RECEIVING PORTION

CROSS-REFERENCE TO RELATED APPLICATION

This application claims the benefit of priority to Japanese Patent Application No. 2005-287263, filed Sep. 30, 2005, of which full contents are incorporated herein by reference.

BACKGROUND OF THE INVENTION

1. Field of the Invention

The present invention relates to an optical pickup unit capable of reproducing data recorded on a medium such as an optical disc and recording data onto the medium, and to a method of manufacturing the optical pickup unit.

2. Description of the Related Art

FIG. 11 is an explanatory view of one form of a conventional optical pickup unit.

The optical pickup unit generally designated at 501 is used to perform reproduction or recording of data such as information on a medium not shown. The medium can be e.g., an optical disc not shown such as a CD (Compact Disc).

Current is supplied from a laser driver 530 to a laser diode 540 so that laser light is issued from the laser diode 540. Laser means e.g., one utilizing dielectric emission for amplification of light. Laser is an abbreviation of "light amplification by stimulated emission of radiation". The laser diode is abbreviated to "LD". The laser driver 530 serves as a laser driving circuit 530 that drives the LD 540 for emission of laser light therefrom. Thus, the laser driver is called "LD driver", etc., and is abbreviated to "LDD". The LDD 530 supplies the LD 540 with current so that information is recorded on a disc 900 or information recorded on the disc 900 is reproduced by the action of laser light emitted from the LD 540.

Laser light from the LD 540 is applied via a diffraction grating 560, an intermediate lens 570, a half mirror 600, and an objective lens 710 to the disc 900. The diffraction grating 560 utilizes diffraction of light to divide laser light issued from the LD 540 into several beams of light not shown.

The half mirror is abbreviated to "HM". The objective lens is abbreviated to "OBL". The OBL 710 serves to condense laser light onto a signal portion 910 of the disc 900.

Part of laser light issued from the LD 540 enters a front monitor diode 650. The front monitor diode is abbreviated to "FMD". The FMD 650 monitors laser light issued from the LD 540 to provide feedback for controlling the LD 540. Part of laser light reflected from the disc 900 impinges on a photo diode IC 820. The photo diode IC is abbreviated to "PDIC". When receiving light, the PDIC 820 converts the signal into an electric signal to output a signal for operating a servo mechanism not shown of a lens holder 720 of the optical pickup unit 501. Servo or servo mechanism means, e.g., one or a mechanism measuring the status of an object to be controlled and comparing the measurement with a reference value to provide automatic adjusting control.

A housing 510 is disposed to house the LDD 530, the LD 540 the diffraction grating 560, the intermediate lens 570, the HM 600, the FMD 650, the lens holder 720 fitted with the OBL 710, and the PDIC 820. The housing means e.g. a box-shaped enclosure or an analogue to the box that holds components.

The LDD 530, the LD 540, the FMD 650, and the PDIC 820 are connected conductively to a flexible printed circuit 520. The flexible printed circuit is abbreviated to "FPC". A process of fabricating the FPC will be described. A plurality of circuit conductors 520c in the form of e.g., metal foils such as copper foils are printed on an insulating sheet 520s such that the circuit conductors are juxtaposed on the insulating sheet. On top of the circuit conductors is disposed a protective layer not shown to form an FPC. The FPC 520 is formed as a two-layer flexible printed board or a so-called double-sided flexible printed board having the circuit conductors disposed on both sides of the insulating sheet.

The optical pickup unit 501 is configured to include the above various components. Although the optical pickup unit 501 includes other constituent elements not shown than the above shown, those constituent elements are not shown for convenience' sake in FIG. 11.

The FPC 520 is connected to the LD 540, etc., after which the LD 540 is mounted on the housing 510 while being positioned thereto.

Laser light from the LD 540 of the optical pickup unit 501 passes through the OBL 710 to impinge on the optical disc 900 such as a CD loaded in the interior of a player body. Information is recorded on the optical disc 900 or information recorded on the optical disc 900 is reproduced by the action of laser light issued from the LD 540. Recording or reproduction of information is thus performed by the optical pickup unit 501.

Another conventional optical pickup unit can be e.g., one capable of securely positioning a light emitting device and a light receiving device for mounting and of enhancing the effect of heat radiation without imparting unnecessary stresses to those elements (see, e.g., p. 3, FIGS. 1 to 5 of Japanese Patent Application Laid-Open Publication No. 2005-141821).

It was however a difficult work for the above conventional optical pickup unit 501 of FIG. 11 to securely mount the LD 540 on the housing 510 with high accuracy with the LD 540 being connected to the entire FPC 520. Although the FPC 520 is partially shown in FIG. 11 to facilitate understanding of the configuration of the optical pickup unit 501, the actual FPC 520 has a larger area extending to most of the housing 510.

When mounting the LD 540 on the housing 510, the LD 540 is fitted to the housing 510 while allowing the LD 540 to emit laser light. At that time, the entire FPC 520 connected to the LD 540 is obstructive, making it difficult to mount the LD 540 on the housing 510.

Execution of such a difficult work during the manufacturing process of the optical pickup unit 501 reduces the yield of the optical pickup unit 501, with the result that the price of the optical pickup unit 501 may rise.

An inadvertent shock to the housing 510 with which the optical pickup unit 501 is configured may cause the LD 540 or the so-called light emitting device 540 to disengage from the housing 510 with which the optical pickup unit 501 is configured.

SUMMARY OF THE INVENTION

In order to solve the above problems, an aspect of the present invention provides an optical pickup unit comprising a circuit connected to a light emitting device emitting light and a counterpart circuit connected to the circuit, the circuit being soldered to the counterpart circuit. With this configuration, the optical pickup unit is configured with the light emitting device securely mounted. In a conventional optical pickup unit, when a light emitting device including an entire circuit is mounted on the optical pickup unit, the mounting operation of the light emitting device on the optical pickup unit has been a difficult operation since the entire circuit blocks the operation. However, if the circuit connected to the light emitting device is separated from the counterpart circuit connected to the circuit, when the light emitting device including the circuit is mounted on the optical pickup unit, generation of an inconvenience is avoided that the light emitting device cannot be mounted on the optical pickup unit because the counterpart circuit blocks the operation. The circuit connected to the light emitting device is connected to the counterpart circuit with solder to send electricity from the counterpart circuit through the circuit to the light emitting device.

The optical pickup unit according to the present invention further comprises a holding member that can house the light emitting device and a housing that can be mounted with the holding member, wherein the light emitting device is inserted in the holding member, and wherein the holding member is mounted on the housing with the holding member positioned to the housing. With this configuration, the light emitting device housed in the holding member is securely mounted on the housing. If the light emitting device is inserted in the holding member that can house the light emitting device, the position of the light emitting device is easily adjusted. By using the holding member that can house the light emitting device, the mounting operation of the light emitting device to the housing can be easily performed.

The optical pickup unit according to the present invention further comprises a holding member that houses the light emitting device and a housing that is mounted with the holding member, wherein the housing includes a peripheral wall and a dividing wall that forms compartments within the peripheral wall, wherein the light emitting device connected to the circuit is inserted in the holding member, wherein a receiving portion surrounded by the peripheral wall and the dividing wall is disposed in the housing correspondingly to the holding member, and wherein the holding member is mounted on the receiving portion. With this configuration, the holding member housing the light emitting device is continuously mounted on the housing securely and easily. In the conventional optical pickup unit, for example, when an impact is made carelessly on the housing constituting the optical pickup unit or the holding member, the holding member housing the light emitting device may be detached from the housing constituting the optical pickup unit. However, if the holding member housing the light emitting device is mounted on the receiving portion of the housing, the holding member housing when an impact is made carelessly on the housing constituting the optical pickup unit or the holding member.

In the optical pickup unit according to the present invention, the circuit is disposed with a notch portion that makes an unnecessary portion of the circuit easily removed from the main body of the circuit. With this configuration, the light emitting device including the circuit is easily mounted on the optical pickup unit. Since the circuit is disposed with a notch portion that makes an unnecessary portion of the circuit easily removed from the main body of the circuit, the removing operation of the unnecessary portion of the circuit is easily performed. Since the removing operation of the unnecessary portion of the circuit is performed efficiently, the manufacturing operation of the optical pickup unit is performed efficiently.

To solve the above problems, an aspect of the present invention provides a manufacturing method of an optical pickup unit, comprising the steps of mounting a light emitting device connected to a circuit on a housing, positioning and mounting the light emitting device on the housing while allowing the light emitting device to emit light at the time of the step of mounting, and soldering the circuit to a counterpart circuit that is to be connected with the circuit subsequently. With this configuration, the light emitting device is securely mounted on the housing. Since the circuit connected to the light emitting device is soldered to the counterpart circuit after the light emitting device is mounted on the housing, there is avoided difficulty in mounting the light emitting device on the housing due to blocking by the entire circuit when carrying out the mounting. Since the circuit connected to the light emitting device is not soldered to the counterpart circuit when the light emitting device is mounted on the housing, the counterpart circuit does not block the positioning operation when the light emitting device is positioned and mounted on the housing. Therefore, the manufacturing method of the optical pickup unit is provided that can mount the light emitting device securely on the housing.

In the manufacturing method of an optical pickup unit according to the present invention, with the light emitting device inserted in a holding member that can house the light emitting device, the holding member is mounted on the housing while being positioned thereto. With this configuration, the light emitting device housed by the holding member is mounted securely on the housing. If the light emitting device is inserted in the holding member that can house the light emitting device, the position of the light emitting device is easily adjusted. By using the holding member that can house the light emitting device, the mounting operation of the light emitting device on the housing can be easily performed.

In the manufacturing method according to the present invention, the housing is disposed with a peripheral wall and a dividing wall that forms compartments within the peripheral wall, wherein the light emitting device connected to the circuit is inserted in a holding member that can house the light emitting device, wherein a receiving portion surrounded by the peripheral wall and the dividing wall is disposed in the housing correspondingly to the holding member, and wherein the holding member is mounted on the receiving portion while being positioned thereto. With this configuration, the holding member housing the light emitting device is continuously mounted on the housing securely and easily. In the conventional optical pickup unit, for example, when an impact is made carelessly on the housing constituting the optical pickup unit or the holding member, the holding member housing the light emitting device may be detached from the housing constituting the optical pickup unit. However, if the holding member with the light emitting device inserted is mounted on the receiving portion surrounded by the peripheral wall constituting the housing and the dividing wall forming compartments within the peripheral wall, the holding member housing the light emitting device is hardly detached from the housing when an impact is made carelessly on the housing constituting the optical pickup unit or the holding member. Since the counterpart circuit is not soldered to the circuit connected to the light emitting device when the holding member with the light emitting device inserted is positioned and mounted on the receiving portion surrounded by the peripheral wall constituting the housing and the dividing wall forming compartments within the peripheral wall, this prevents the generation of the inconvenience that the holding member with the light emitting device inserted has difficulty in being mounted on the housing due to blocking by the entire circuit. Therefore, the holding member with the light emitting device inserted is securely mounted on the housing without being blocked by the counterpart circuit, etc.

In the manufacturing method of an optical pickup unit according to the present invention, the circuit soldered to the light emitting device is connected to a power supply device that can supply electricity, and wherein by applying the electricity from the power supply device through the circuit to the light emitting device, the light emitting device is allowed to emit the light. With this configuration, the light emitting device is securely and accurately mounted on the housing. By supplying the electricity from the power supply device through the circuit to the light emitting device, the light emitting device is allowed to emit the light. Based on the light emitted from the light emitting device, the light emitting device is securely and accurately positioned and mounted on the housing.

In the manufacturing method of an optical pickup unit according to the invention, a power supply device supplying electricity to the light emitting device to light the light emitting device is linked to a device connecting portion of the circuit soldered to the light emitting device, wherein while applying the electricity from the power supply device through the circuit to the light emitting device to allow the light emitting device to emit light, the light emitting device is positioned and mounted on the housing, and wherein the device connecting portion of the circuit linked to the power supply device is subsequently removed from the main body of the circuit. With this configuration, the optical pickup unit is configured with the light emitting device accurately and securely mounted on the housing. By supplying the electricity from the power supply device through the circuit to the light emitting device, the light emitting device is allowed to emit the light. Based on the light emitted from the light emitting device, the light emitting device is securely and accurately positioned and mounted on the housing. The device connecting portion of the circuit linked to the power supply device is subsequently removed from the main body of the circuit and the circuit is soldered to the counterpart circuit.

In the manufacturing method of an optical pickup unit according to the present invention, a notch portion is disposed on the circuit to easily remove from the circuit the device connecting portion of the circuit that has been connected to a power supply device supplying electricity to the light emitting device to light the light emitting device and the device connecting portion is removed from the main body of the circuit based on the notch portion. With this configuration, the device connecting portion of the circuit is easily removed from the main body of the circuit. Since the notch portion is disposed on the circuit, the connecting portion removing operation for removing the device connecting portion from the main body of the circuit is quickly performed based on the notch portion.

In the manufacturing method of an optical pickup unit according to the present invention, after the light emitting device including the circuit is positioned and mounted on the housing, the device connecting portion of the circuit is removed that has been connected to a power supply device supplying electricity to the light emitting device to light the light emitting device and the circuit is subsequently soldered to the counterpart circuit. With this configuration, the circuit is securely soldered to the counterpart circuit. After the light emitting device including the circuit is positioned and mounted on the housing, the device connecting portion of the circuit is removed that has been connected to the power supply device; therefore, the circuit is securely soldered to the counterpart circuit; and the circuit is securely connected to the counterpart circuit.

An optical pickup unit according to the present invention is manufactured based on the manufacturing method of an optical pickup unit according to the present invention. With this configuration, the optical pickup unit can be configured with the light emitting device securely mounted on the housing. In the conventional optical pickup unit, when a light emitting device including the entire circuit is mounted on the optical pickup unit, the mounting operation of the light emitting device on the optical pickup unit has been a difficult operation since the entire circuit blocks the operation. However, since the optical pickup unit is manufactured by soldering the circuit connected to the light emitting device to the counterpart circuit after the light emitting device is mounted on the housing, there is avoided difficulty in mounting the light emitting device on the housing due to blocking by the entire circuit when carrying out the mounting. Since the circuit connected to the light emitting device is not soldered to the counterpart circuit when the light emitting device is mounted on the housing, the counterpart circuit does not block the positioning operation when the light emitting device is positioned and mounted on the housing. Therefore, the optical pickup unit can be provided with the light emitting device mounted securely on the housing.

BRIEF DESCRIPTION OF THE DRAWINGS

For more thorough understanding of the present invention and advantages thereof, the following description should be referenced in conjunction with the accompanying drawings, in which.

DETAILED DESCRIPTION OF THE INVENTION

Figure 1:
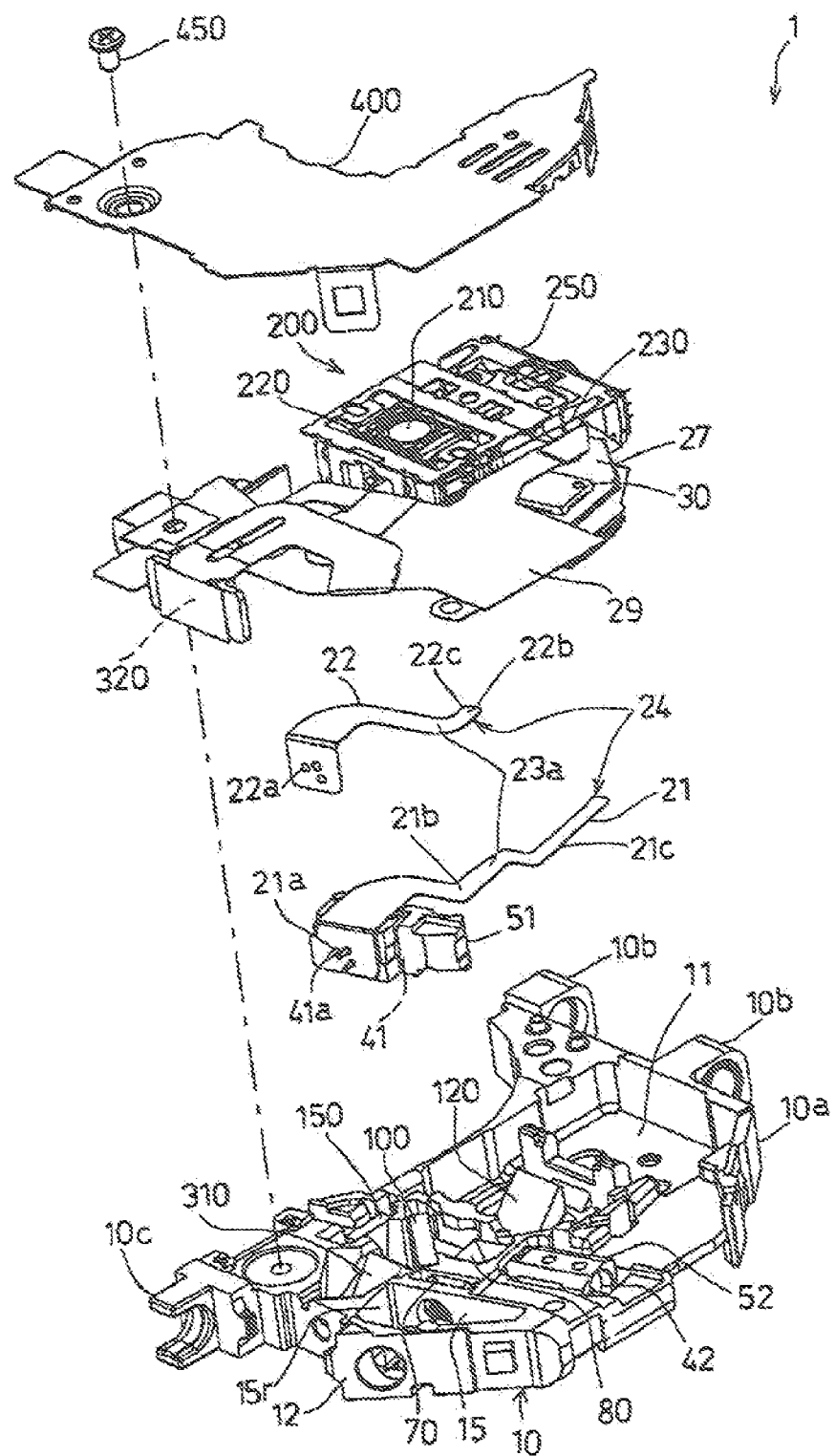
FIG. 1 is an exploded perspective view of one embodiment of an optical pickup unit and a manufacturing method thereof according to the present invention.

At least the following details will become apparent from the descriptions of this specification and of the accompanying drawings.

Referring to the drawings, detailed description will now be made of one embodiment of an optical pickup unit and a method of manufacturing the optical pickup unit in accordance with the present invention.

Figure 2:
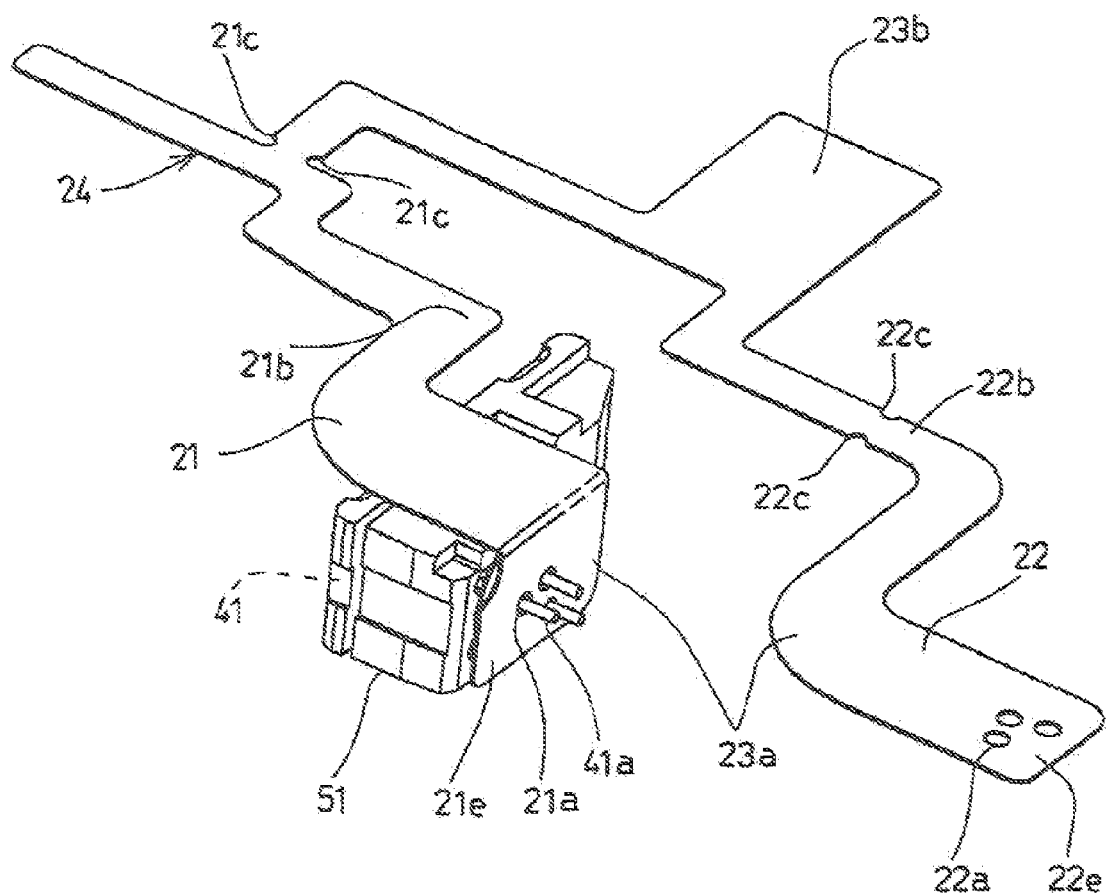
FIG. 2 is a perspective view showing a state of a circuit being connected to a light emitting device that lies within a holding member with which the optical pickup unit is configured.
Figure 3:
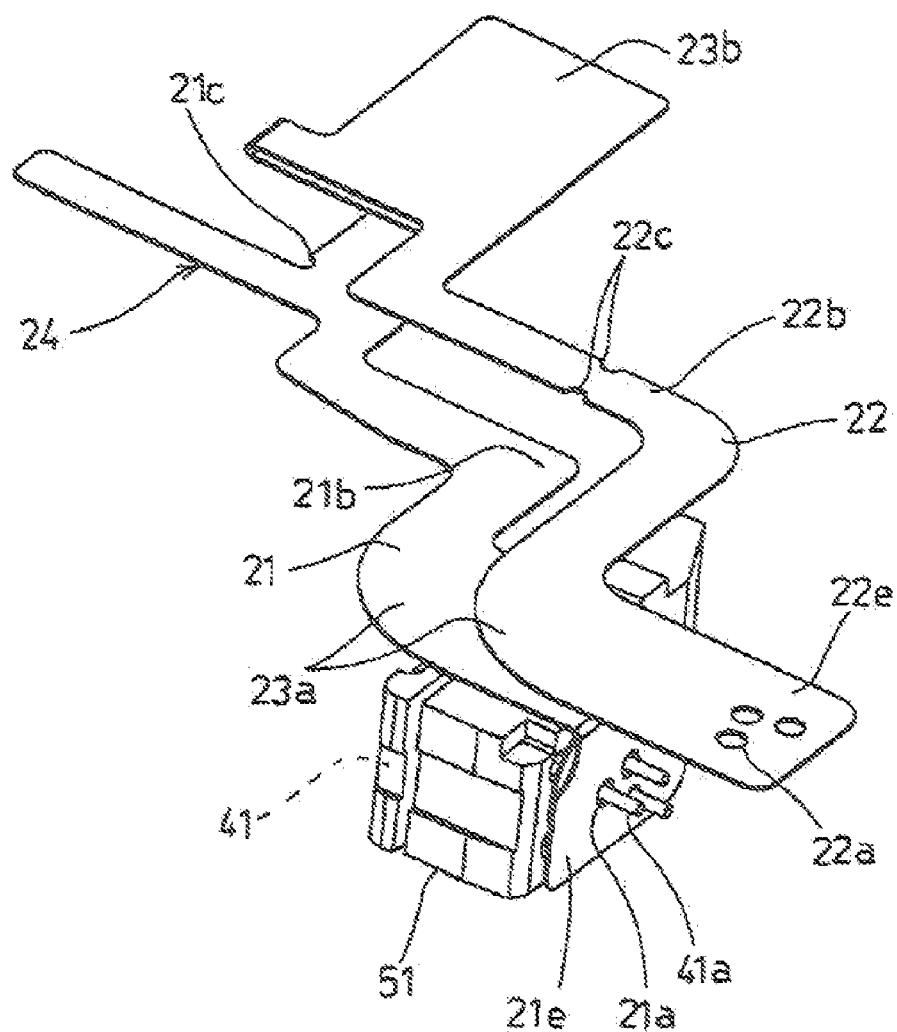
FIG. 3 is a perspective view, similar to FIG. 2, showing a state of the circuit being connected to the light emitting device that lies within the holding member.
Figure 4:
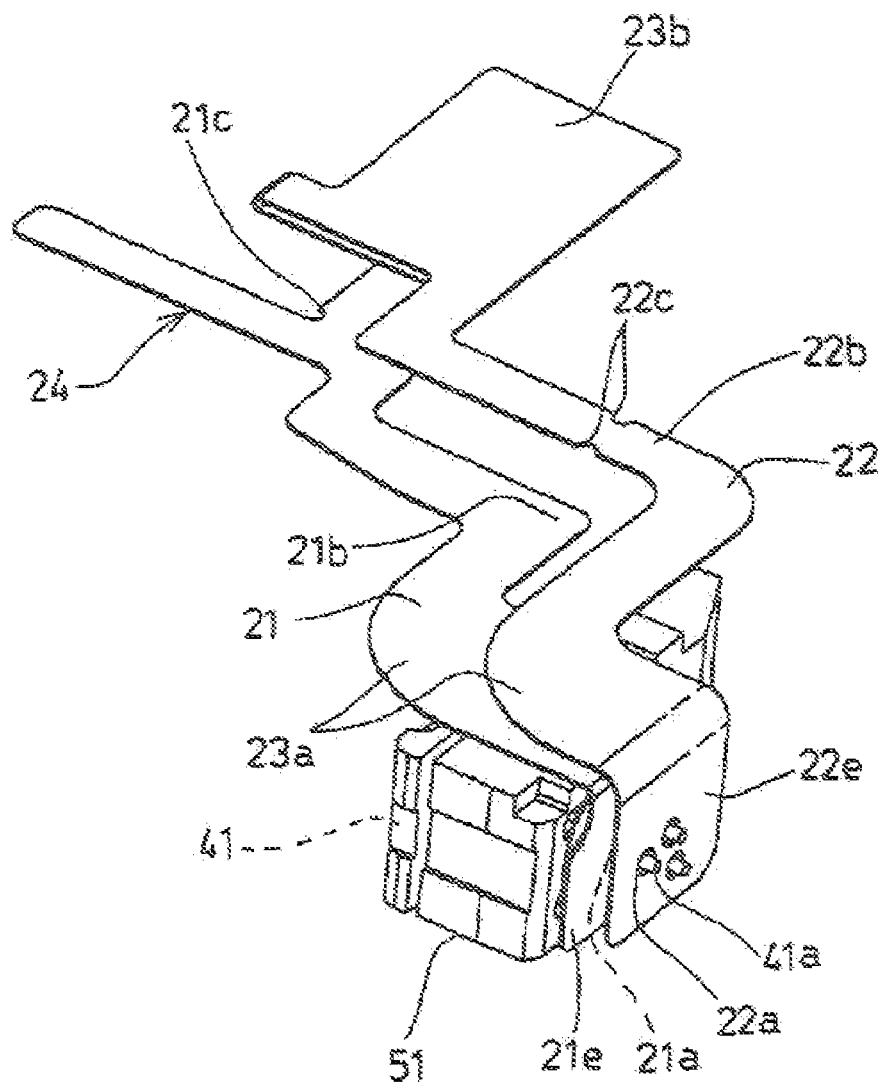
FIG. 4 is a perspective view, similar to FIG. 2, showing a state of the circuit being connected to the light emitting device that lies within the holding member.
Figure 5:
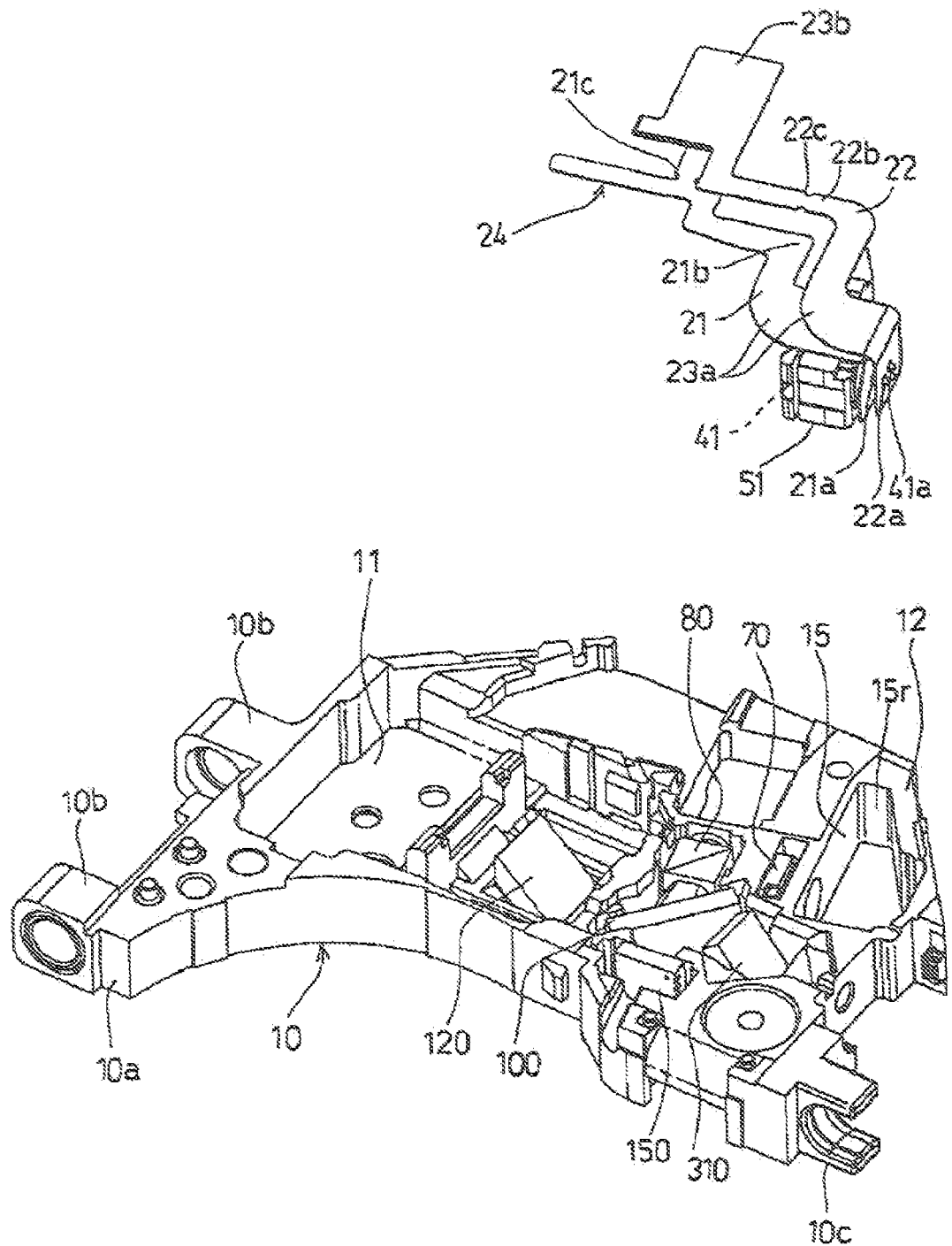
FIG. 5 is an exploded perspective view showing a state of the light emitting device with the circuit being mounted on a housing.
Figure 6:
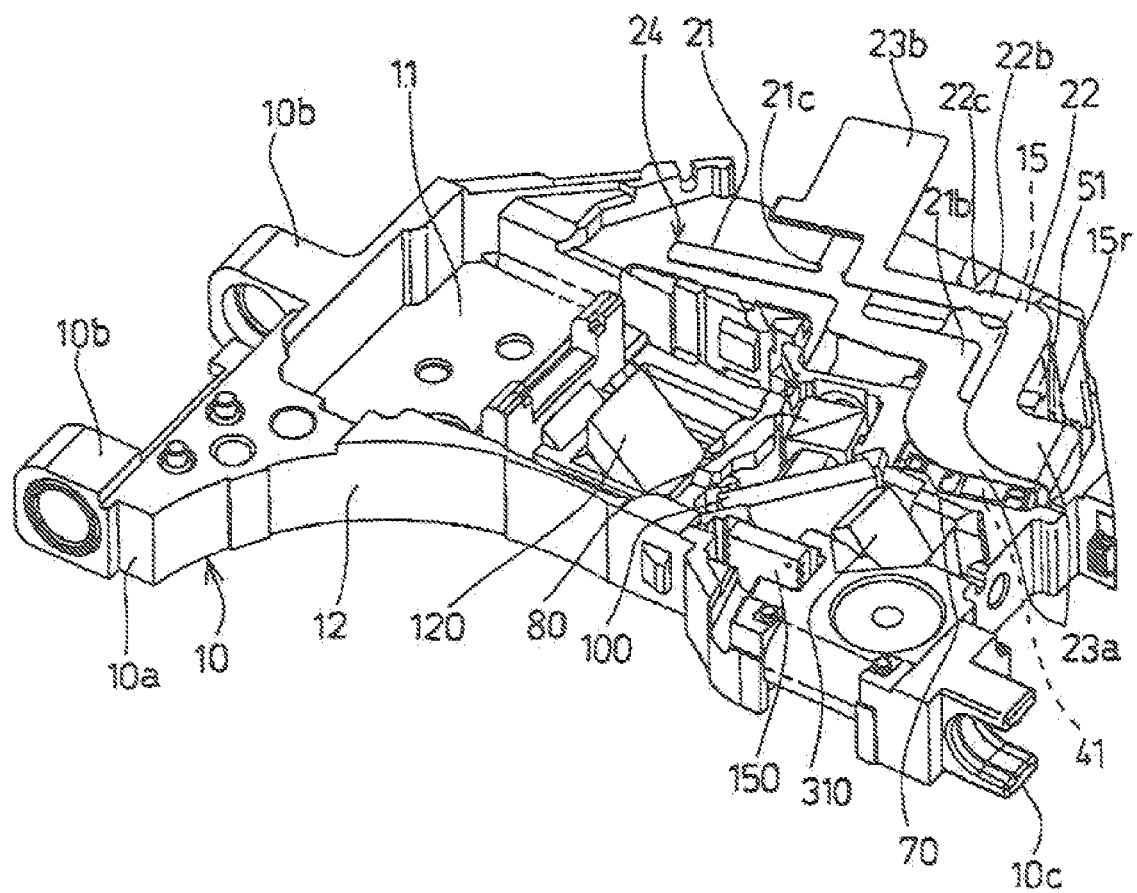
FIG. 6 is a perspective view showing a state of the light emitting device with the circuit mounted on the housing.
Figure 7:
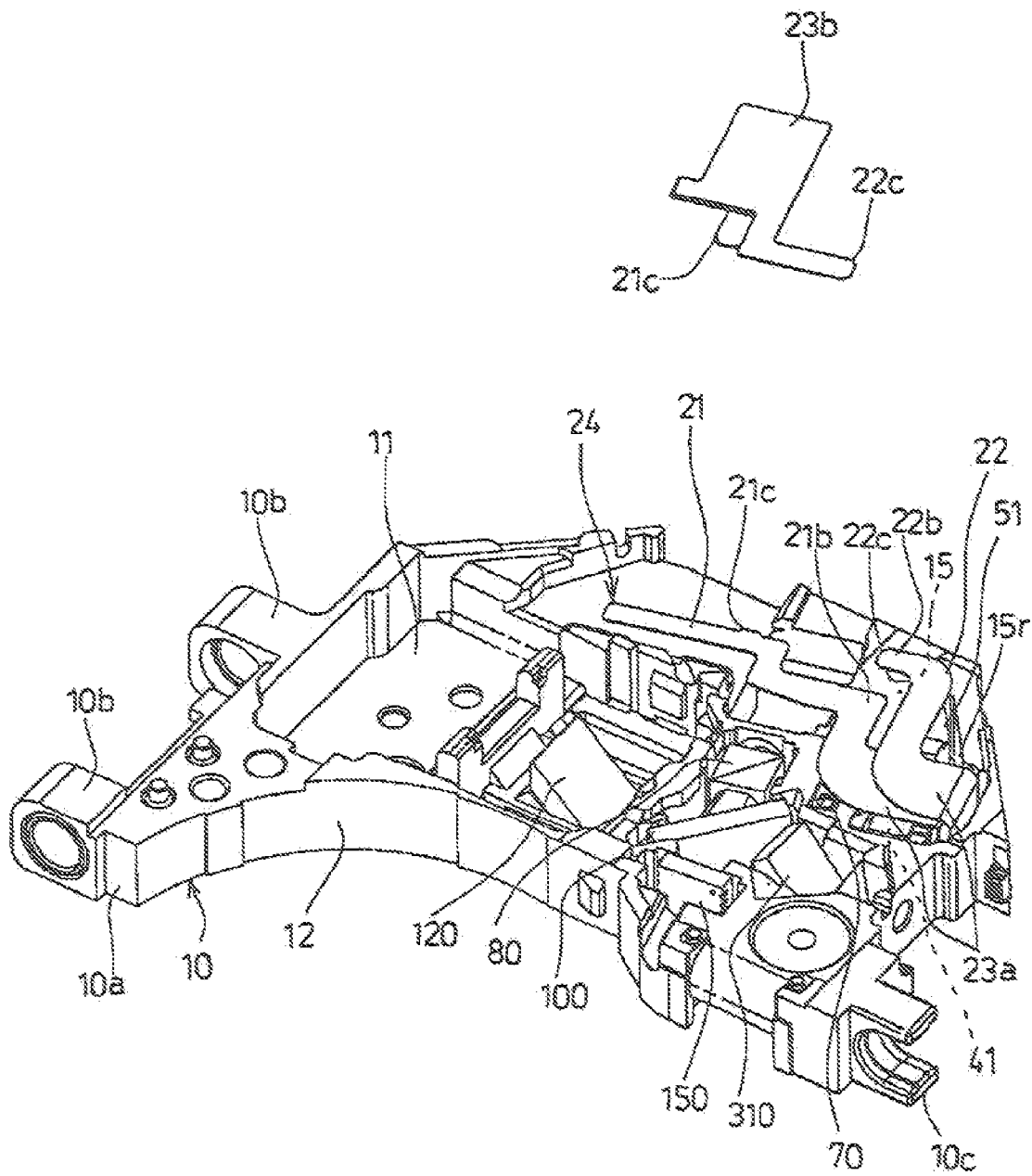
FIG. 7 is an exploded perspective view showing a state of a part of the circuit removed from a main body of the circuit.
Figure 8:
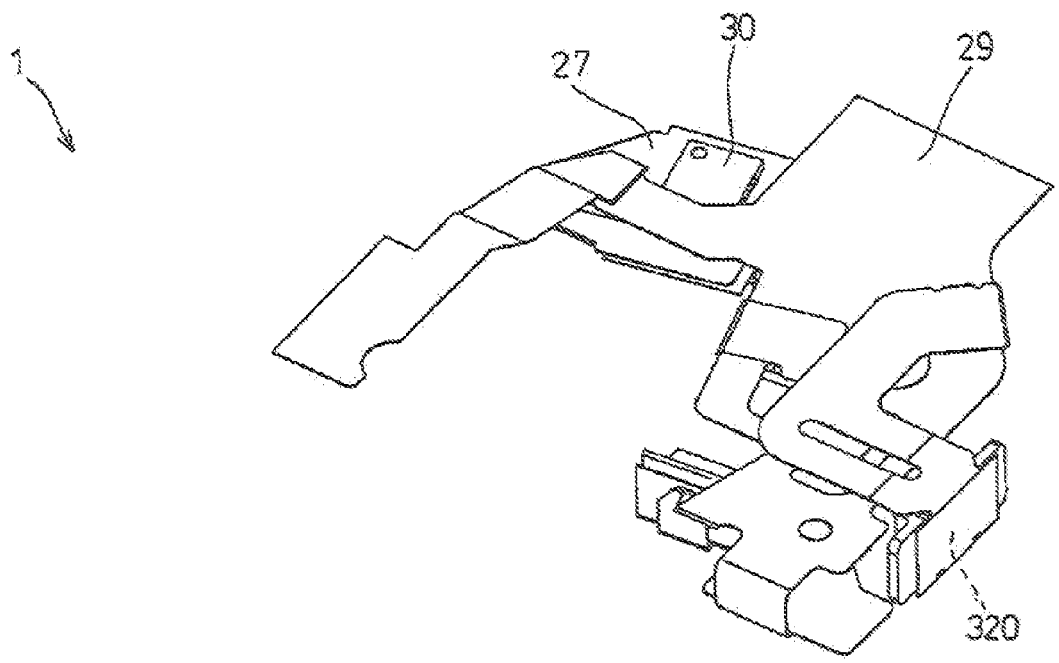
FIG. 8 is an exploded perspective view showing a state of a counterpart circuit being connected to the circuit.
Figure 8:
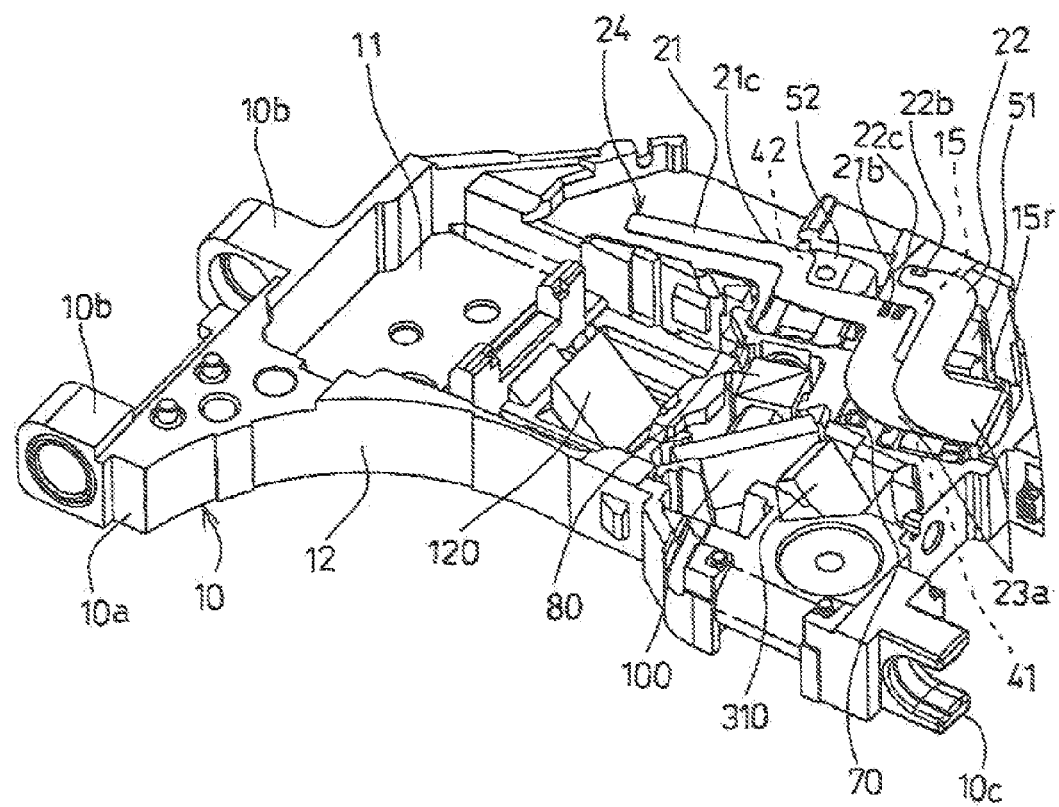
Figure 9:
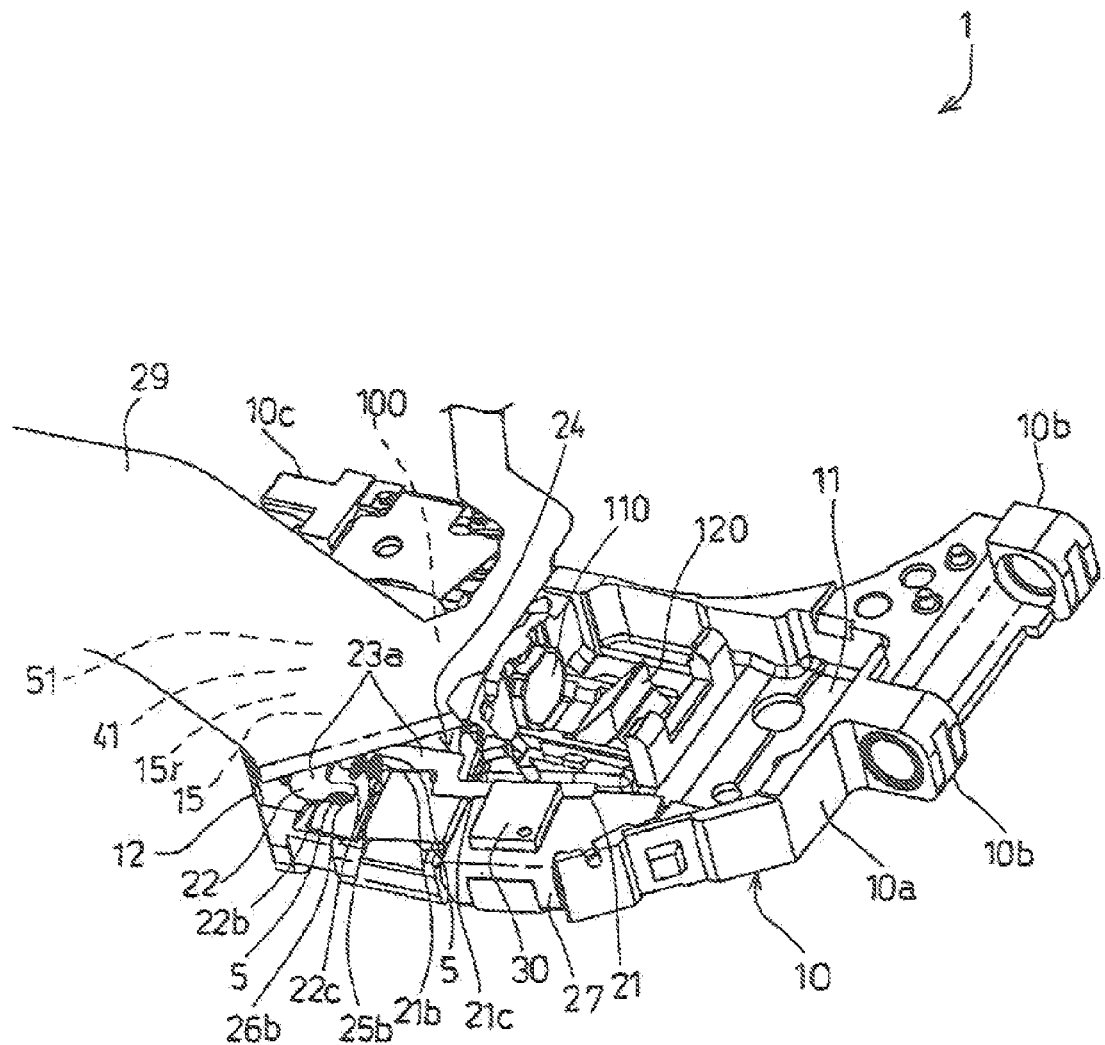
FIG. 9 is a perspective view showing a state of the counterpart circuit connected to the circuit.
Figure 10:
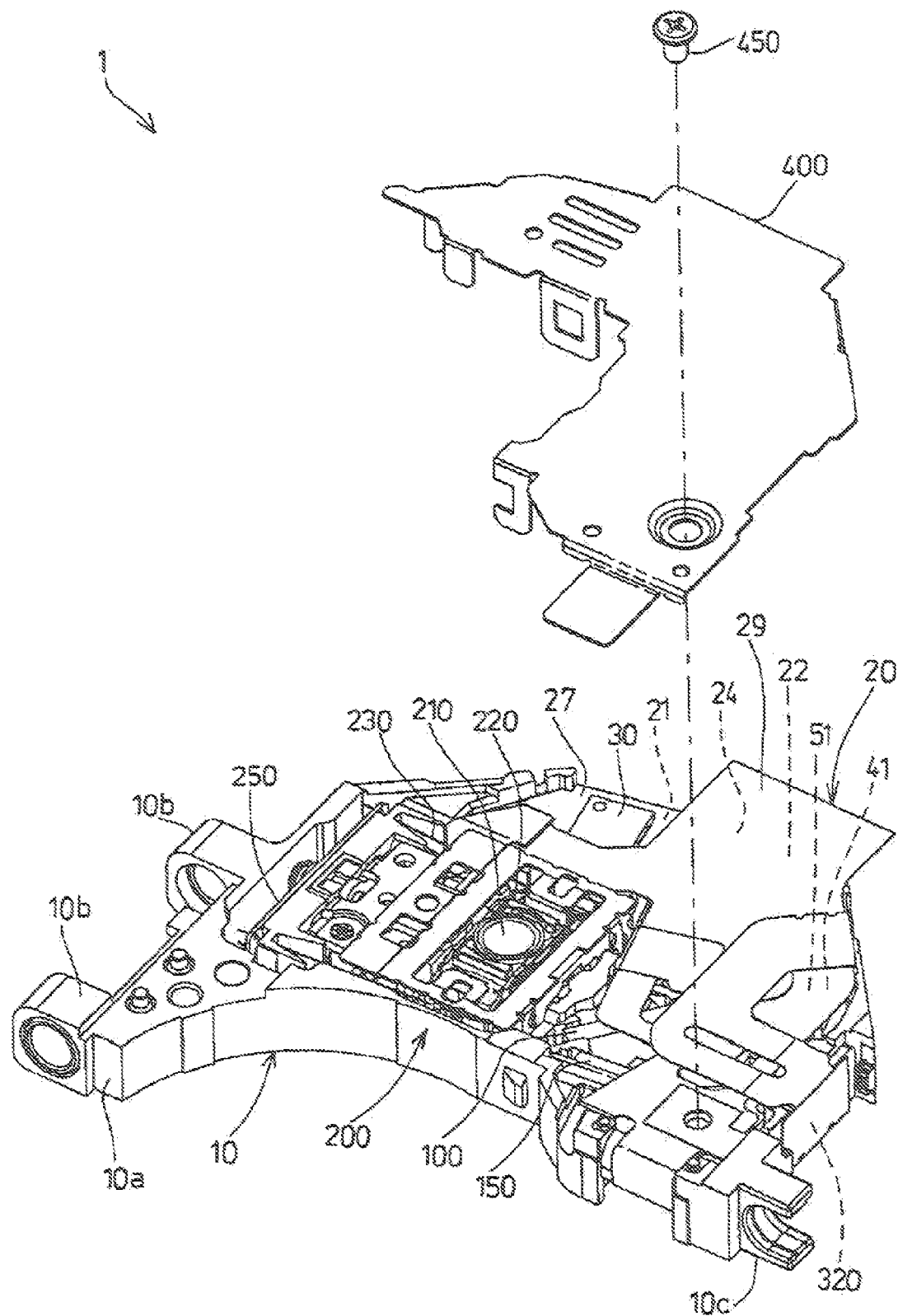
FIG. 10 is an exploded perspective view showing a state of the optical pickup unit being assembled.
Figure 11:
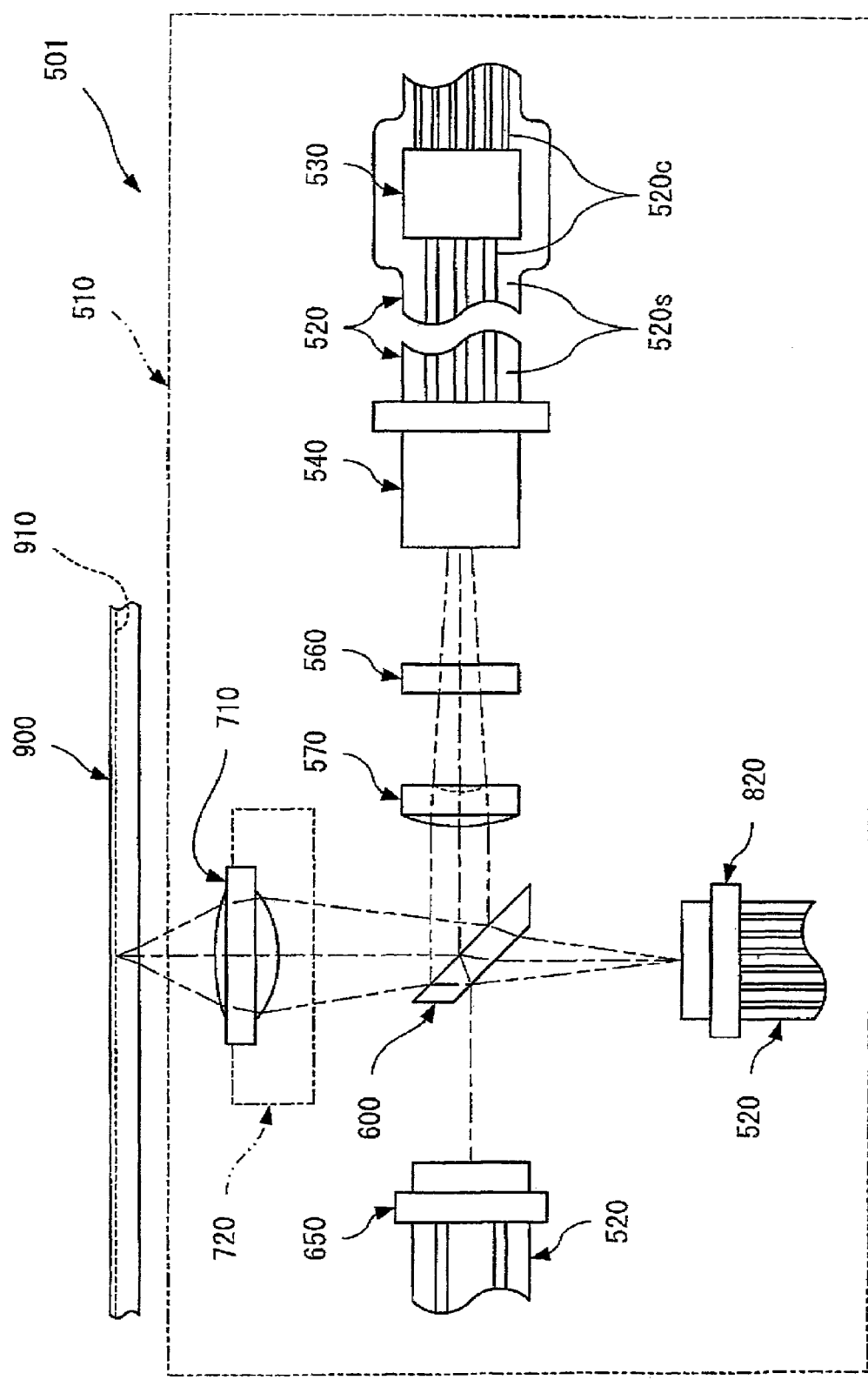
FIG. 11 is an explanatory view of one form of a conventional optical pickup unit.

FIG. 1 is an exploded perspective view of one embodiment of an optical pickup unit and a manufacturing method thereof according to the present invention; FIG. 2 is a perspective view showing a state of a circuit being connected to a light emitting device that lies within a holding member with which the optical pickup unit is configured; FIG. 3 is a perspective view, similar to FIG. 2, showing a state of the circuit being connected to the light emitting device that lies within the holding member; FIG. 4 is a perspective view, similar to FIG. 2, showing a state of the circuit being connected to the light emitting device that lies within the holding member; FIG. 5 is an exploded perspective view showing a state of the light emitting device with the circuit being mounted on a housing; FIG. 6 is a perspective view showing a state of the light emitting device with the circuit mounted on the housing; FIG. 7 is an exploded perspective view showing a state of a part of the circuit removed from a main body of the circuit; FIG. 8 is an exploded perspective view showing a state of a counterpart circuit being connected to the circuit; FIG. 9 is a perspective view showing a state of the counterpart circuit connected to the circuit; FIG. 10 is an exploded perspective view showing a state of the optical pickup unit being assembled; and FIG. 11 is an explanatory view of one form of a conventional optical pickup unit.

The optical pickup unit generally designated at 1 (FIGS. 1, 10) is used to perform reproduction or recording of data such as information on a medium not shown. The medium can be e.g., a CD-type optical disc not shown or a DVD-type optical disc not shown. "CD" is an abbreviation of "Compact Disc" (trademark). "DVD" is an abbreviation of "Digital Versatile Disc" (registered trademark).

Typical optical discs will be described in detail. The optical discs can be, e.g., a data read-only optical disc such as "CD-ROM" and "DVD-ROM", a data recordable optical disc such as "CD-R", "DVD-R", and "DVD+R", and a data writable/erasable or data rewritable optical disc such as "CD-RW", "DVD-RW", "DVD+RW" (registered trademark), "DVD-RAM", "HD DVD" (trademark), and "Blu-ray Disc" (trademark).

"ROM" of "CD-ROM" OR "DVD-ROM" is an abbreviation of "Read Only Memory". "CD-ROM" or "DVD-ROM" is for data/information read only use. "R" of "CD-R", or "DVD-R" or "DVD+R" is an abbreviation of "Recordable". "CD-R", or "DVD-R" or "DVD+R" allows recording of data/information. "RW" of "CD-RW", or "DVD-RW" or "DVD+RW" is an abbreviation of "Re-Writable". "CD-RW", or "DVD-RW" or "DVD+RW" allows rewriting of data/information. "DVD-RAM" is an abbreviation of "Digital Versatile Disc Random Access Memory". "DVD-RAM" allows data/information to be read, written or erased.

The "HD DVD" is an abbreviation of "High Definition DVD". The "HD DVD" has a compatibility with the conventional DVD series and has a storage capacity larger than the conventional DVD series. The infrared laser has been used in the conventional CD. The red laser has been used in the conventional DVD. However, when reading data/information recorded in "HD DVD" optical discs, the blue-violet laser is used. The "Blu-ray" means the blue-violet laser employed for achieving higher-density recording than the red laser that is used to read or write conventional signals.

The optical discs include an optical disc (not shown) disposed with signal surfaces on the both disc sides that can write/erase data or rewrite data. The optical discs include an optical disc (not shown) disposed with a two-layered signal surface that can write/erase data or rewrite data. The optical discs include an "HD-DVD" optical disc (not shown) disposed with a three-layered signal surface that can write/erase data or rewrite data. The optical discs include a "Blu-ray" optical disc (not shown) disposed with a four-layered signal surface that can write/erase data or rewrite data.

The optical pickup unit 1 is used when reproducing data recorded on the various optical discs and when recording data on the various writable of rewritable optical discs. The optical pickup unit 1 supports a CD medium and a DVD medium. This optical pickup unit 1 can support a plurality of types of media.

An electric current is applied from a laser driver 30 (FIG. 1, FIGS. 8 to 10) to a DVD light emitting device 41 (FIGS. 1 to 8) and laser light is output form the DVD light emitting device 41. The laser driver 30 is mounted on a counterpart circuit 27 (FIG. 1, FIGS. 8 to 10) constituting a flexible circuit 20 (FIG. 10). The electric current is applied from the counterpart circuit 27 mounted with the laser driver 30 through a circuit 24 (FIGS. 1 to 9) to the DVD light emitting device 41 and the laser light is output form the DVD light emitting device 41.

The DVD light emitting device 41 is a DVD laser diode (LD) that emits laser light with a wavelength of about 630 to 670 nm (nanometer). The DVD LD 41 is housed in a metal holding member 51, which is a so-called metal holder 51. In accordance with the design/specification of the optical pickup unit 1, for example, a CD light emitting device housed in a first holder (51) may be used instead of the DVD light emitting device 41. Since the LD is housed in the holder, this holder is also referred to as a laser holder or an LD holder.

The laser driver 30 (FIG. 1, FIGS. 8 to 10) is a laser drive circuit that drives a first LD 41 (FIGS. 1 to 8) to emit laser light from the first LD 41. Since the laser driver is a driver that drives the LD, the laser driver is referred to as an LD driver or is abbreviated to LDD. The LDD 30 supplies the first LD 41 with an electric current and the laser light is emitted from the first LD 41 to record information on the optical disc such as DVD+R and to reproduce information recorded on the optical disc such as DVD+R.

An electric current is applied from the laser driver 30 (FIG. 1, FIGS. 8 to 10) to a CD light emitting device 42 (FIGS. 1 and 8) and the CD light emitting device 42 outputs laser light. A current is applied from the counterpart circuit 27 mounted with the laser driver 30 to the CD light emitting device 42 and the CD light emitting device 42 emits laser light.

The CD light emitting device 42 (FIGS. 1, 8) is a CD laser diode (LD) that emits laser light with a wavelength of about 770 to 805 nm. The CD LD 42 is housed in a metal holding member 52, which is a so-called metal holder 52. In accordance with the design/specification of the optical pickup unit 1, for example, a DVD light emitting device housed in a second holder (52) may be used instead of the CD light emitting device 42.

The LDD 30 (FIG. 1, FIGS. 8 to 10) is a laser drive circuit that drives a second LD 42 to emit laser light from the second LD 42 (FIGS. 1 to 8). The LDD 30 supplies the second LD 42 with an electric current and the laser light is emitted from the second LD 42 to record information on the optical disc such as CD-R and to reproduce information recorded on the optical disc such as CD-R.

A flexible circuit 20 (FIG. 10) linking various electronic components includes a main circuit 29 (FIG. 1, FIGS. 8 to 10), a counterpart sub-circuit 27 subsequent to the main circuit 29, and a sub-circuit 24 (FIGS. 1 to 8) connected to the counterpart sub-circuit 27.

A flexible printed circuit is used as a flexible circuit 20. The flexible printed circuit is abbreviated to "FPC". The FPC is formed by printing a plurality of circuit conductors (not shown) on an insulating sheet, disposing a metal foil such as a copper foil on the insulating sheet, and disposing a protect layer (not shown) on the foil. In each figure, the circuits 20, 24, 27, 29 are shown with the circuit conductors and the protect layers of the circuits 20, 24, 27, 29 omitted. The circuits 20, 24, 27, 29 are shown in a simplified form for convenience.

The laser light output from the first LD 41 passes through an intermediate optical component 70, is reflected within a polarizing beam splitter (PBS) 80 substantially orthogonally while passing therethrough, is reflected by a reflect mirror 100 substantially orthogonally, passes through a collimator lens 110 (FIG. 9), is reflected by a mirror 120 (FIG. 1, FIGS. 5 to 9) substantially orthogonally, passes through an objective lens 210 (FIG. 1, FIG. 10), and is applied to the optical disc.

The laser light output from the second LD 42 passes through the PBS 80 substantially straight, is reflected by the reflect mirror 100 substantially orthogonally, is reflected by the mirror 120 substantially orthogonally, passes through the OBL 210, and is applied to the optical disc.

The light path of the laser light output from the DVD LD 41 is reflected within the PBS 80 substantially orthogonally while passing therethrough. On the other hand, the light path of the laser light output from the CD LD 42 passes through the PBS 80 substantially straight. This is a difference between the light path of the DVD laser light and the light path of the CD laser light. However, the light path of the DVD laser light and the light path of the CD laser light are the same except this difference.

The intermediate optical component 70 (FIG. 1, FIG. 5) collects the laser light emitted from the first LD 41 or the second LD 42. The intermediate optical component 70 may be called and handled as an intermediate lens, a divergent lens, a coupling lens, and a sensor lens, for example.

The polarizing beam splitter 80 (FIG. 1, FIGS. 5 to 8) has different characteristics depending on the wave length of the DVD laser light and the wave length of the CD laser light. For example, when the DVD laser light emitted from the DVD light emitting device 41 (FIGS. 5 to 8) is made incident on the polarizing beam splitter 80, the polarizing beam splitter 80 reflects the DVD laser light therein substantially orthogonally. For example, when the CD laser light emitted from the CD light emitting device 42 (FIG. 1, FIG. 8) is made incident on the polarizing beam splitter 80, the polarizing beam splitter 80 allows the CD laser light to pass through therein substantially straight. The polarizing beam splitter is abbreviated to PBS, for example. The "PBS" is an abbreviation of "polarized beam splitter" or "polarizing beam splitter".

The reflect mirror 100 (FIG. 1, FIGS. 5 to 8), for example, reflects a portion of the laser light or transmits certain laser light. The reflect mirror 100 is made of glass with excellent optical characteristics. The reflect mirror is abbreviated to "RM". In accordance with the design/specification of the optical pickup unit 1, for example, a half mirror can be used in stead of the RM 100.

The collimator lens 110 (FIG. 9) forms parallel light from the light made incident on this lens from the side of the LD 41, 42, i.e., the side of RM 100, and emits the parallel light to the mirror 120. The parallel light means light that travels parallel without spreading. Contrary, diffusion light means light of a light source that emits light in various directions in a diffused manner. The collimator lens is abbreviated to "CL", for example.

The mirror 120 (FIG. 1, FIGS. 5 to 9) reflects the entire laser light substantially orthogonally.

The objective lens 210 (FIG. 1, FIG. 10) functions to collect the laser light emitted from the LD 41 or LD 42 on a signal portion of the optical disc. The objective lens is abbreviated to "OBL". The OBL 210 is mounted on a lens holder 220. The lens holder 220 including the OBL 210 is supported movably by a plurality of suspension wires 230. The suspension wires 230 are attached to a control substrate 250.

When focus servo of the lens holder 220 including the OBL 210 is performed for the optical disc, the lens holder 220 including the OBL 210 is moved in the vertical directions. When tracking servo of the lens holder 220 including the OBL 210 is performed for the optical disc, the lens holder 220 including the OBL 210 is moved in the horizontal direction. When the focal point of the laser light is focused by the OBL 210 on the signal layer of the optical disc, the lens holder 220 mounted on the OBL 210 is driven by the actuator 200 in the left, right, upward and downward directions. The definition of "upward", "downward", "left", and "right" in this specification is made for convenience of description of the optical pickup unit.

The focus means a focal point or focal spot. The tracking means tracking minute pits (holes, dents), grooves (trenches), wobbles (meandering), and the like with the use of light so as to determine a position in an orbit formed in a spiral manner.

The actuator means a driving apparatus that converts energy into translation motion or rotary motion, for example. The actuator 200 includes, for example, the lens holder 220 mounted with the OBL 210, coils that drive the lens holder 220 with an electromagnetic force generated by applying electric currents, a magnet facing to the coils and always generating the magnetic flux, and a yoke mounted with the magnet.

When the laser light is emitted from the side of the LD 41, 42 (FIG. 1, FIG. 8) to the front side of the RM 100, a major part of the laser light is reflected. The major part of the laser light reflected by the RM 100 is transmitted through the CL 110 (FIG. 9), reflected entirely by the mirror 120, is transmitted through the OBL 210 (FIG. 1, FIG. 10), and is applied to the optical disc. However, a portion of the laser light is transmitted through the RM 100 (FIG. 1, FIGS. 5 to 8, FIG. 10) to be applied to a light receiving device 150 (FIG. 1, FIGS. 5 to 7, FIG. 10).

When the laser light is reflected by the optical disc, is transmitted through the OBL 210 (FIG. 1, FIG. 10), is reflected by the mirror 120 (FIG. 1, FIGS. 5 to 9), and passes through the CL 110 (FIG. 9) to be applied to the RM 100 (FIG. 1, FIGS. 5 to 8, FIG. 10), a major part of the laser light is transmitted through the RM 100, is transmitted through a substantially flat plate optical component 310 (FIG. 1, FIGS. 5 to 8), and is applied to a photodiode IC 320 (FIG. 1, FIG. 8, FIG. 10).

A portion of the laser light output from the first LD 41 or the second LD 42 is transmitted through the RM 100 to be applied to the light receiving device 150 (FIG. 1, FIGS. 5 to 7, FIG. 10). A portion of the laser light output from the first LD 41 or the second LD 42 is detected by the light receiving device 150 on the back side of the RM 100. In this specification, the definition of "front" and "back" is made for convenience of description of the optical pickup unit.

The light receiving device 150 is a front monitor diode to which a portion of the laser light is applied. The light receiving device 150 monitors the laser light output from the LD 41 (FIGS. 1 to 8) or the LD 42 (FIG. 1, FIG. 8) to perform feedback for controlling the LD 41, 42. The front monitor diode is abbreviated to "FMD".

A portion of the laser light reflected by the optical disc passes through the OBL 210 (FIG. 1, FIG. 10), is reflected by the mirror 120 (FIG. 1, FIG. 9) substantially orthogonally, passes through the CL 110 (FIG. 9), the RM 100 (FIG. 1, FIGS. 5 to 8), and the optical component 310, and is applied to the photodiode IC 320 (FIG. 1, FIG. 8, FIG. 10).

The optical component 310 (FIG. 1, FIGS. 5 to 8) is formed as a substantially flat plate and generates astigmatism of the laser light. After the astigmatism is generated, the laser light is applied to the photodiode IC 320.

The photodiode IC 320 is a photodetector that receives the laser light reflected by the optical disc and converts the signal into an electric signal to detect information recorded on the optical disc. The photodiode IC 320 is a photodetector that receives the laser light reflected by the optical disc and converts the signal into an electric signal to operate the servo mechanism of the lens holder 220 with the OBL 210 constituting the optical pickup unit 1. The photodiode IC includes a combination of a photodiode and an integrated circuit, for example. The photodiode IC is abbreviated to "PDIC".

The above various components are mounted on a housing 10 made of a metal/plastic (FIG. 1, FIGS. 5 to 10). The housing means, for example, a box-shaped object or a box-like object that houses apparatuses, components, etc.

The housing includes a housing body 10a mounted with the above various components, a pair of first bearing portions 10b, 10b projected from the housing body 10a to be combined with a first shaft (not shown) movably, and a second bearing portion 10c projected from the housing body 10a in the direction opposite to the first bearing portions 10b, 10b to be combined with a second shaft (not shown) movably. The housing 10 is made of a thermoplastic and heat-resistant synthetic resin material that can be injection-molded, for example.

The first bearing portions 10b, 10b and the second bearing portion 10c are injection-molded and formed integrally with the housing body 10a, for example. The first bearing portions 10b, 10b, the second bearing portion 10c, and the housing body 10a are made of the same material and formed integrally by the injection molding.

By forming the housing 10 using the synthetic resin material based on the injection molding, the weight of the housing 10 can be reduced. Therefore, the weight of the optical pickup unit 1 including the housing 10 can be reduced. By forming the housing 10 using the synthetic resin material based on the injection molding, even when the housing 10 has a complex shape shown in FIGS. 1 and 5, the housing 10 can be produced in high volume efficiently.

With regard to the thermoplastic and heat-resistant synthetic resin material that can be injection-molded, the material includes, for example, polyarylene sulfide resin such as polyphenylene sulfide (PPS), which is excellent in thermal stability, electric characteristics such as insulating characteristics, mechanical characteristics, and dimensional stability. For example, PPS is used as a base material in DIC (registered trade mark) of Dainippon Ink And Chemicals, Inc. Specifically, PPS includes, for example, DIC·PPS_FZ-2100, etc., of Dainippon Ink And Chemicals, Inc.

In accordance with the design/specification of the optical pickup unit 1, for example, the housing can be formed with the use of non-ferrous metals such as zinc and aluminum or alloys containing zinc and aluminum as a substitute for plastic such as PPS. Zinc and aluminum are excellent in corrosion resistance and are non-ferrous metals with a specific gravity less than that of iron.

After the above various components are mounted on the housing 10 (FIG. 1, FIG. 10), a cover plate 400 is placed on the top surface of the housing 10 to protect the various components in the housing 10. The cover plate 400 is press-formed from a thin-walled metal plate with excellent heat-release characteristics. The cover plate 400 is fixed to the housing 10 with the use of a fastener 450 such as a screw 450.

The optical pickup unit 1 (FIG. 1, FIG. 10) includes the LD 41 and LD 42 (FIG. 1, FIG. 8) emitting the laser light, the sub-circuit 24 (FIGS. 1 to 8) connected electrically to the LD 41, the counterpart sub-circuit 27 (FIG. 1, FIGS. 8 to 10) connected electrically to the sub-circuit 24, the main circuit 29 (FIG. 1, FIGS. 8 to 10) subsequent to the counterpart sub-circuit 27, and the housing 10 mounted with the LD 41, 42 and the circuits 24, 27, 29.

The sub-circuit 24 is soldered to the LD 41 (FIG. 4, FIG. 5) and the sub-circuit 24 is soldered to the counterpart sub-circuit 27 (FIG. 9) to connect the LD 41, the sub-circuit 24, and the counterpart sub-circuit 27 electrically.

As a result, the optical pickup unit 1 is configured with the LD 41 securely mounted. In a conventional optical pickup unit 501 (FIG. 11), when an LD 540 including an entire circuit 520 is mounted on the optical pickup unit 501, the mounting operation of the LD 540 on the optical pickup unit 501 has been a difficult operation since the entire circuit 520 blocks the operation.

However, if the sub-circuit 24 connected to the LD 41 (FIG. 1) is separated from the counterpart sub-circuit 27 connected electrically to the sub-circuit 24, when the LD 41 including the sub-circuit 24 is mounted on the housing 10 of the optical pickup unit 1, generation of an inconvenience is avoided that the LD 41 cannot be mounted on the housing 10 because the counterpart sub-circuit 27 or the main circuit 29 with which the optical pickup unit 1 is configured blocks the operation. The sub-circuit 24 connected electrically to the LD 41 (FIGS. 1 to 8) is connected electrically to the counterpart sub-circuit 27 with a solder material 5 (FIG. 9) to send electricity from the counterpart sub-circuit 27 through the sub-circuit 24 to the LD 41.

Environment-friendly solder that does not contain lead, i.e., Pb-free solder is used as the solder material. If the Pb-free solder is used as the solder material, for example, when discarding the optical pickup unit 1 (FIG. 1, FIG. 10) or the flexible circuit 20 (FIG. 10) mounted on the optical pickup unit 1, it is avoided that lead affects the natural environment. The Pb-free solder includes, for example, Eco Solder (registered trademark) of Senju Metal Industry Co., Ltd. Specifically, the Pb-free solder includes, for example, Eco Solder M30 of Senju Metal Industry Co., Ltd. Reflow-type Pb-free solder includes, for example, Eco Solder L21 of Senju Metal Industry Co., Ltd. A normal solder material can also be used instead of the Pb-free solder. A normal solder material includes, for example, Sparkle Paste OZ of Senju Metal Industry Co., Ltd.

Since the components are connected electrically by soldering the LD 41 to the sub-circuit 24 (FIG. 4, FIG. 5), soldering the sub-circuit 24 to the counterpart sub-circuit 27 (FIG. 9), soldering the LDD to the counterpart sub-circuit 27, and soldering various electronic components to the main circuit 29, a base of each circuit 24, 27, 29 is formed with the use of a heat-resistant synthetic polymer such as a polyimide resin, which has excellent heat-resisting properties. Polyimide is abbreviated to "PI". The FPC having the base formed with the use of a polyimide resin includes, for example, Nitoflex (registered trademark) of Nitto Denko Corporation and Kapton (registered trademark) of Du Pont-Toray Co., Ltd.

Products of Nitoflex (registered trademark) of Nitto Denko Corporation include, for example, a high-resolution FPC (both sides), high-resolution FPC, fine-connection FPC, high-insulation-reliability FPC, high-heat-resistance FPC, and high-flexibility FPC. Products of Kapton (registered trademark) of Du Pont-Toray Co., Ltd. include, for example, H-type, V-type, Super V-type, EN-type, and KJ-type. Kapton (registered trademark) of Du Pont-Toray Co., Ltd. can be used in a wide temperature range from a very low temperature of about −269 degrees C. to a high temperature of about +400 degrees C.

As shown in FIGS. 1 to 8, the sub-circuit 24 includes a plurality of circuit members 21, 22 having one-layer circuit conductors (not shown). The sub-circuit 24 includes the two circuit members 21, 22 having one-layer circuit conductors. The circuit members 21, 22 are soldered to the LD 41.

If the circuit members 21, 22 having one-layer circuit conductors are mounted on the housing 10, the inexpensive optical pickup unit 1 is formed. A circuit member (not shown) having a two-layer circuit conductor may be expensive than the circuit members 21, 22 having one-layer circuit conductors. For example, when comparing a price of one circuit member having the two-layer circuit conductor with a price of the two circuit members 21, 22 having the one-layer circuit conductors, the price of the two circuit members 21, 22 having the one-layer circuit conductors may be inexpensive than the price of one circuit member having the two-layer circuit conductor. By mounting the inexpensive circuit members 21, 22 on the housing 10 of the optical pickup unit 1, the inexpensive optical pickup unit 1 is formed.

The sub-circuit 24 includes a first circuit member 21 that has a one-layer signal circuit conductor to which electricity is applied when the laser light is emitted from the LD 41 and a second circuit member 22 that has a one-layer ground circuit conductor to which electricity is applied when the laser light is emitted from the LD 41.

If such circuit members 21, 22 are mounted on the housing 10, the inexpensive optical pickup unit 1 is formed. The circuit members 21, 22 having the two-layer circuit conductors may be expensive than the circuit members 21, 22 having the one-layer circuit conductors. By connecting the first circuit member 21 that has the inexpensive one-layer signal circuit conductor and the second circuit member 22 that has the inexpensive one-layer ground circuit conductor to the LD 41 and applying electricity to the first circuit member 21 and the second circuit member 22, the laser light is emitted from the LD 41. The signal means a signal. The ground means ground.

This optical pickup unit 1 (FIG. 1, FIG. 10) includes the holder 51 (FIGS. 1 to 5) that can house the LD 41. While the LD 41 is inserted in the holder 51, the LD 41 is soldered to the sub-circuit 24.

A terminal 41a in a substantially round bar shape is disposed on the LD 41 (FIGS. 1 to 4) and the terminal 41a is projected from the main body (not shown) of the LD 41. A first connecting portion 21a in a substantially circular hole shape, corresponding to the terminal 41a of the LD 41, is disposed in the first circuit member 21 constituting the sub-circuit 24. The first connecting portion 21a in a substantially circular hole shape is bored in the first circuit member 21 of the sub-circuit 24. A first connecting portion 22a in a substantially circular hole, corresponding to the terminal 41a of the LD 41, shape is disposed in the second circuit member 22 constituting the sub-circuit 24. The first connecting portion 22a in a substantially circular hole shape is bored in the second circuit member 22 of the sub-circuit 24.

First, the terminal 41a of the LD 41 is combined with the first connecting portion 21a of the first circuit member 21 (FIGS. 1 to 4). The terminal 41a of the LD 41 is then combined with the first connecting portion 22a of the second circuit member 22 (FIG. 4, FIG. 5). The first connecting portion 21a of the first circuit member 21 and the first connecting portion 22a of the second circuit member 22 are soldered to the terminal 41a of the LD 41 at the same time.

A second connecting portion 21b (FIG. 8) is disposed in the first circuit member 21 constituting the sub-circuit 24 (FIGS. 1 to 5). A counterpart connecting portion 25b (FIG. 9) corresponding to the second connecting portion 21b of the first circuit member 21 is disposed in the counterpart sub-circuit 27. The counterpart connecting portion 25b of the counterpart sub-circuit 27 is combined with the second connecting portion 21b of the first circuit member 21, and the second connecting portion 21b of the first circuit member 21 is soldered to the counterpart connecting portion 25b of the counterpart sub-circuit 27.

A second connecting portion 22b is disposed in the second circuit member 22 constituting the sub-circuit 24 (FIGS. 1 to 5). A counterpart connecting portion 26b (FIG. 9) corresponding to the second connecting portion 22b of the second circuit member 22 is disposed in the counterpart sub-circuit 27. The counterpart connecting portion 26b of the counterpart sub-circuit 27 is combined with the second connecting portion 22b of the second circuit member 22, and the second connecting portion 22b of the second circuit member 22 is soldered to the counterpart connecting portion 26b of the counterpart sub-circuit 27.

By soldering in this way, the sub-circuit 24 including the circuit members 21, 22 is securely connected to the counterpart sub-circuit 27 electrically. By soldering the counterpart connecting portions 25b, 26b of the counterpart sub-circuit 27 to the second connecting portions 21b, 22b of the circuit members 21, 22 with which the sub-circuit 24 is configured, the sub-circuit 24 is securely connected to the counterpart sub-circuit 27.

As shown in FIGS. 1 and 5, this optical pickup unit 1 includes the holder 51 that can house the LD 41 and the housing 10 that can be mounted with the holder 51. The LD 41 is inserted in a receiving portion of the holder 51 (FIGS. 1 to 5). The holder 51 is mounted on the housing 10 while the holder 51 including the LD 41 is positioned accurately in a receiving portion 15r (FIG. 5) of the housing 10 (FIGS. 6 to 8).

Therefore, the LD 41 housed in the holder 51 is accurately and securely mounted on the housing 10. If the LD 41 connected to the sub-circuit 24 is inserted in the holder 51 that can house the LD 41, the position of the LD 41 is easily adjusted. By using the holder 51 that can house the LD 41, the mounting operation of the LD 41 to the housing 10 can be easily performed.

As shown in FIGS. 1 and 5, this housing 10 includes a base wall 11 in a substantially flat plate shape, a substantially circular peripheral wall 12 substantially orthogonal to the base wall 11, and a dividing wall 15 in a substantially flat plate shape that forms compartments within the peripheral wall 12. The LD 41 soldered to the sub-circuit 24 (FIG. 4, FIG. 5) is inserted in a receiving portion of the holder 51. A receiving portion 15r (FIG. 1, FIG. 5) surrounded by the peripheral wall 12 and the dividing wall 15 is disposed in the housing 10 correspondingly to the holder 51. The holder 51 including the LD 41 soldered to the sub-circuit 24 is disposed in the receiving portion 15r surrounded by the peripheral wall 12 and the dividing wall 15 (FIGS. 6 to 8). The terminal 41a of LD 41 (FIGS. 1 to 5) is located in the peripheral wall 12 of the housing 10 (FIGS. 6 to 8).

Therefore, the holder 51 housing the LD 41 is continuously mounted on the housing 10 securely and easily. In the conventional optical pickup unit 501 (FIG. 11), for example, when an impact is made carelessly on the housing 510 constituting the optical pickup unit 501 or the holder (not shown) housing the LD 540, the holder housing the LD 540 may be detached from the housing 510 constituting the optical pickup unit 501.

However, if the holder 51 housing the LD 41 (FIGS. 5 to 8) is disposed in the receiving portion of the housing 10 and the terminal 41a (FIGS. 1 to 5) of the LD 41 is located in the peripheral wall 12 of the housing, the holder 51 housing the LD 41 is hardly detached from the housing 10 even when an impact is made carelessly on the housing 10 constituting the optical pickup unit 1 or the holder 51.

To position and mount the holder 51 including the LD 41 on the housing 10 (FIG. 6) accurately, the holder 51 is positioned and mounted on the housing 10 while emitting laser light from the LD 41 in the holder 51. Therefore, a power adjustment/supply device (not shown) is used that supplies the LD 41 with electricity to light the LD 41. A connecting portion (not shown) of the power adjustment/supply device (not shown) is coupled to a device connecting portion 23b of the sub-circuit 24. The power adjustment/supply device not shown applies electricity through the sub-circuit 24 to the LD 41 and the LD 41 emits light.

After the holder 51 including the LD 41 is positioned and mounted on the housing 10 accurately, as shown in FIG. 7, an unnecessary portion 23b of the sub-circuit 24 is removed from the main body 23a of the sub-circuit 24. Therefore, substantially curved notch portions 21c, 22c (FIGS. 2 to 5) are disposed in the sub-circuit 24 to easily remove the unnecessary portion 23b of the sub-circuit 24 from the main body 23a of the sub-circuit 24.

When this sub-circuit 24 is used, the LD 41 including the sub-circuit 24 is easily mounted on the housing 10 of the optical pickup unit 1 in the assembling process of the optical pickup unit 1. Since the substantially curved notch portions 21c, 22c are disposed in the sub-circuit 24 to easily remove the unnecessary portion 23b of the sub-circuit 24 from the main body 23a of the sub-circuit 24, the removing operation of the unnecessary device connection portion 23b of the sub-circuit 24 is performed relatively easily. Since the removing operation of the unnecessary device connecting portion 23b of the sub-circuit 24 is performed efficiently, the manufacturing operation of the optical pickup unit 1 is performed efficiently.

After the unnecessary device connecting portion 23b of the sub-circuit 24 is removed from the main body 23a of the sub-circuit 24, as shown in FIGS. 7 and 8, traces of the substantially curved notch portions 21c, 22c are left.

A manufacturing method of the optical pickup unit 1 will be described in detail. Although the manufacturing method of the optical pickup unit 1 has been briefly described above, the manufacturing method of the optical pickup unit 1 will hereinafter be described in detail with reference to the drawings.

First, the terminal 41a in a substantially round bar shape is disposed on the LD 41 (FIGS. 2 to 4) and the terminal 41a is projected from the main body of the LD 41. The first connecting portions 21a, 22a in a substantially circular hole shape, corresponding to the terminal 41a of the LD 41, are disposed in the sub-circuit 24, and are bored in the sub-circuit 24.

The LD 41 is inserted into the holder 51 that can house the LD 41, and the sub-circuit 24 is soldered to the LD 41 in this state. After folding the sub-circuit 24, the sub-circuit 24 is soldered to the LD 41. After folding the first circuit member 21 and the second circuit member 22 constituting the sub-circuit 24 substantially orthogonally along the holder 51 housing the LD 41 (FIG. 4), the substantially circular hole shaped connecting portions 21a, 22a of the sub-circuit 24 electrically connected to the LD 41 emitting the laser light are soldered to the substantially round bar shaped terminal 41a of the LD 41. The first connecting portions 21a, 22a of the sub-circuit 24 are combined with the terminal 41a of the LD 41a, and the first connecting portions 21a, 22a of the sub-circuit 24 are soldered to the terminal 41a of the LD 41.

As shown in FIGS. 5 and 6, the sub-circuit 24 and the LD 41 with the sub-circuit 24 soldered are mounted on the housing 10. The sub-circuit 24 is folded substantially orthogonally and the LD 41 with the sub-circuit 24 soldered is mounted on the housing 10. The LD 41 is positioned and mounted on the housing 10 while the LD 41 emits the laser light. As shown in FIG. 9, the sub-circuit 24 is soldered to the counterpart sub-circuit 27 electrically connected to the sub-circuit 24.

By assembling the optical pickup unit 1 based on such an assembling step procedure of the optical pickup unit 1, the LD 41 is accurately and securely mounted on the housing 10. Since the LD 41 soldered to the sub-circuit 24 is positioned and mounted on the housing 10 while emitting the laser light from the LD 41 soldered to the sub-circuit 24, the LD 41 is accurately and securely mounted on the housing 10. Since the sub-circuit 24 soldered to the LD 41 is soldered to the counterpart sub-circuit 27 after the LD 41 is mounted on the housing 10, there is avoided difficulty in mounting the LD 41 on the housing 10 due to blocking by the entire circuit 20 (FIG. 10) when carrying out the mounting.

Since the sub-circuit 24 soldered to the LD 41 is not soldered to the counterpart sub-circuit 27 (FIGS. 8 to 10) when the LD 41 is positioned and mounted on the housing 10 (FIG. 5, FIG. 6), the counterpart sub-circuit 27 does not block the positioning operation when the LD 41 is positioned and mounted on the housing 10. Therefore, manufacturers, etc., of the optical pickup unit 1 can be provided with the manufacturing method of the optical pickup unit 1 that can mount the LD 41 accurately and securely on the housing 10.

In the state that the LD 41 soldered to the sub-circuit 24 is inserted in the holder 51 that can house the LD 41 (FIGS. 5 to 7), the holder 51 is mounted on the housing 10 while being positioned thereto.

Therefore, the LD 41 housed in the holder 51 is securely mounted on the housing 10. If the LD 41 soldered to the sub-circuit 24 is inserted in the holder 51 that can house the LD 41, the position of the LD 41 is easily adjusted. By using the holder 51 that can house the LD 41, the mounting operation of the LD 41 on the housing 10 can be easily performed.

When designing/manufacturing the housing 10 (FIG. 1, FIG. 5), the housing 10 is disposed with the base wall 11 in a substantially flat plate shape, the substantially circular peripheral wall 12 substantially orthogonal to the base wall 11, and the dividing wall 15 that forms compartments within the peripheral wall 12. The receiving portion 15r surrounded by the peripheral wall 12 and the dividing wall 15 is disposed in the housing 10 correspondingly to the holder 51 housing the LD 41. When the assembling operation of the optical pickup unit 1 is performed, the LD 41 soldered to the sub-circuit 24 is inserted in the holder 51 that can house the LD 41. The holder 51 is positioned and disposed in the receiving portion 15r of the housing 10.

Therefore, the holder 51 housing the LD 41 is continuously mounted on the housing 10 securely and easily. In the conventional optical pickup unit 501 (FIG. 11), for example, when an impact is made carelessly on the housing 510 constituting the optical pickup unit 501 or the holder (not shown), the holder housing the LD 540 may be detached from the housing 510 constituting the optical pickup unit 501.

However, if the holder 51 with the LD 41 inserted is disposed in the receiving portion 15r surrounded by the peripheral wall 12 constituting the housing 10 (FIG. 1, FIGS. 5 to 8) and the dividing wall 15 forming compartments within the peripheral wall 12, the holder 51 housing the LD 41 is hardly detached from the housing 10 even when an impact is made carelessly on the housing 10 constituting the optical pickup unit 1 (FIG. 1, FIG. 10) or the holder 51.

Since the counterpart sub-circuit 27 (FIGS. 8 to 10) is not soldered to the sub-circuit 24 soldered to the LD 41 when the holder 51 with the LD 41 inserted is positioned and mounted on the receiving portion 15r surrounded by the peripheral wall 12 constituting the housing 10 (FIG. 5, FIG. 6) and the dividing wall 15 forming compartments within the peripheral wall 12, this prevents the generation of the inconvenience that the holder 51 with the LD 41 inserted has difficulty in being mounted on the housing 10 due to blocking by the entire circuit 20 (FIG. 10). Therefore, the holder 51 with the LD 41 inserted is accurately and securely mounted on the housing 10 without being blocked by the counterpart sub-circuit 27, etc.

When the holder 51 housing the LD 41 is positioned and mounted on the housing 10 (FIG. 6) constituting the optical pickup unit 1, the sub-circuit 24 soldered to the LD 41 is connected to an electricity applying portion (not shown) of the power adjustment/supply device (not shown) that can supply electricity, and the laser light is emitted from the LD 41 by applying electricity from the power adjustment/supply device through the sub-circuit 24 to the LD 41.

Therefore, the LD 41 is securely and accurately mounted on the housing 10. By supplying the electricity from the power adjustment/supply device through the sub-circuit 24 to the LD 41, the laser light is emitted from the LD 41. Based on the laser light emitted from the LD 41, the LD 41 is securely and accurately positioned and mounted on the housing 10.

Describing the process of positioning and mounting the holder 51 housing the LD 41 on the housing 10 (FIG. 6) constituting the optical pickup unit 1 in detail, first, an electricity application connecting portion (not shown) of the power adjustment/supply device (not shown) supplying the LD 41 with electricity to light the LD 41 is linked to the device connecting portion 23b of the sub-circuit 24 soldered to the LD 41. While applying electricity from the power adjustment/supply device through the sub-circuit 24 to the LD 41 to allow the LD 41 to emit the laser light, the holder 51 with the LD 41 inserted is positioned and disposed in the receiving portion 15r of the housing 10. As shown in FIG. 7, the device connecting portion 23b of the sub-circuit 24 linked electrically to the power adjustment/supply device is subsequently removed from the main body 23a of the sub-circuit 24.

Therefore, the optical pickup unit 1 is configured with the holder 51 including the LD 41 accurately and securely disposed in the receiving portion 15r of the housing 10. By supplying the electricity from the power adjustment/supply device through the sub-circuit 24 (FIG. 6) to the LD 41, the laser light is emitted from the LD 41. Based on the laser light emitted from the LD 41, the holder 51 including the LD 41 is securely and accurately positioned and disposed in the receiving portion 15r of the housing 10. The device connecting portion 23b of the sub-circuit 24 (FIG. 7) linked electrically to the power adjustment/supply device is subsequently removed from the main body 23a of the sub-circuit 24. The sub-circuit 24 (FIG. 9) is then soldered to the counterpart sub-circuit 27.

As shown in FIG. 2, a pair of substantially curved first notch portions 21c, 21c are disposed on the first circuit member 21 constituting the sub-circuit 24 to easily remove from the sub-circuit 24 the device connecting portion 23b of the sub-circuit 24 that has been connected to the power applying portion of the power adjustment/supply device supplying electricity to the LD 41 (FIGS. 5 to 7) to light the LD 41.

As shown in FIG. 2, a pair of substantially curved second notch portions 22c, 22c are disposed on the second circuit member 22 constituting the sub-circuit 24 to easily remove from the sub-circuit 24 the device connecting portion 23b of the sub-circuit 24 that has been connected to the power applying portion of the power adjustment/supply device supplying electricity to the LD 41 (FIGS. 5 to 7) to light the LD 41.

The device connecting portion 23b is removed from the main body 23a of the sub-circuit 24 based on the pair of the substantially curved first notch portions 21c disposed on the first circuit member 21 and the pair of the substantially curved second notch portions 22c disposed on the second circuit member 22 (FIG. 7). The device connecting portion 23b is separated from the main body 23a of the sub-circuit 24 by cutting between the pair of the first notch portions 21c, 21c disposed on the sub-circuit 24 (FIGS. 2 to 4) and cutting between the pair of the second notch portions 22c, 22c disposed on the sub-circuit 24 (FIG. 7).

Therefore, the device connecting portion 23b of the sub-circuit 24 is easily removed from the main body 23a of the sub-circuit 24. Since the pairs of the substantially curved notch portions 21c, 21c, 22c, 22c are disposed on the sub-circuit 24, the connecting portion removing operation for removing the device connecting portion 23b from the main body 23a of the sub-circuit 24 by separating the device connecting portion 23b from the main body 23a of the sub-circuit 24 is quickly performed based on the pairs of the substantially curved notch portions 21c, 21c, 22c, 22c disposed on the sub-circuit 24.

A plurality of the circuit members 21, 22 is formed (FIG. 1, FIG. 7, FIG. 8) by removing from the main body 23a of the sub-circuit 24 the device connecting portion 23b of the sub-circuit 24 that has been connected to the power applying portion of the power adjustment/supply device supplying electricity to the LD 41 (FIGS. 2 to 6) to light the LD 41 as shown in FIG. 7. The two circuit members 21, 22 are formed (FIG. 1, FIG. 7, FIG. 8) by removing the device connecting portion 23b from the main body 23a of the sub-circuit 24 (FIGS. 2 to 6).

The sub-circuit 24 (FIG. 2) includes only one layer of the circuit conductor. After folding the sub-circuit 24 (FIG. 3, FIG. 4) and soldering both ends 21e, 22e of the sub-circuit 24 to the LD 41 (FIGS. 4 to 6), a plurality of the circuit members 21, 22 having only one layer of the circuit conductor is formed by cutting (FIG. 7) from the main body 23a of the sub-circuit 24 the device connecting portion 23b that has been connected to the power adjustment/supply device supplying electricity to the LD 41 to light the LD 41.

Specifically, after soldering the both ends 21e, 22e of the sub-circuit 24 (FIGS. 2 to 4) to the LD 41 (FIGS. 4 to 6), by cutting from the main body 23a of the sub-circuit 24 the device connecting portion 23b that has been connected to the power adjustment/supply device supplying electricity to the LD 41 to light the LD 41 (FIG. 7), the first circuit member 21 is formed that has only one layer of the signal transmission circuit conductor to which electricity is applied when the laser light is emitted from the LD 41 and the second circuit member 22 is formed that has only one layer of the ground circuit conductor to which electricity is applied when the laser light is emitted from the LD 41. In accordance with the design/specification of the optical pickup unit 1, for example, the first circuit member (21) can be disposed with only one layer of the ground circuit conductor and the second circuit member (22) can be disposed with only one layer of the signal transmission circuit conductor.

After the holder 51 with the LD 41 including the sub-circuit 24 (FIG. 5, FIG. 6) is positioned and disposed in the receiving portion 15r of the housing 10, from the main body 23a of the sub-circuit 24, the device connecting portion 23b of the sub-circuit 24 is removed that has been connected to the power applying portion of the power adjustment/supply device supplying electricity to the LD 41 to light the LD 41 (FIG. 7). The main body 23a of the sub-circuit 24 is subsequently soldered to the counterpart sub-circuit 27 (FIG. 9).

When performing the assembling process of the optical pickup unit 1, the main body 23a of the sub-circuit 24 is securely soldered to the counterpart sub-circuit 27. After the holder 51 with the LD 41 including the sub-circuit 24 is positioned and mounted on the housing 10, the device connecting portion 23b of the sub-circuit 24 is removed that has been connected to the power applying portion of the power adjustment/supply device and, therefore, the main body 23a of the sub-circuit 24 is securely soldered to the counterpart sub-circuit 27 to securely connect the main body 23a of the sub-circuit 24 and the counterpart sub-circuit 27.

After the various components are mounted on the housing 10 (FIG. 1, FIG. 10), the screw is used to fix the cover plate 400 made of a thin-walled metal plate to the housing 10.

Based on the manufacturing method of the optical pickup unit 1, the optical pickup unit 1 is manufactured (FIG. 10).

If the optical pickup unit 1 is manufactured based on the manufacturing method of the optical pickup unit 1, the optical pickup unit 1 is configured with the holder 51 including the LD 41 securely mounted on the housing 10. In the conventional optical pickup unit 501 (FIG. 11), when the LD 540 including the entire circuit 520 is mounted on the optical pickup unit 501, the mounting operation of the LD 540 on the optical pickup unit 501 has been a difficult operation since the entire circuit 520 blocks the operation.

However, since the optical pickup unit 1 is manufactured by soldering the sub-circuit 24 connected to the LD 41 in the holder 51 to the counterpart sub-circuit 27 after the holder 51 including the LD 41 is mounted on the housing 10, there is avoided difficulty in mounting the LD 41 on the housing 10 due to blocking by the entire circuit 20 (FIG. 10) when mounting the holder 51 including the LD 41 on the housing 10.

As shown in FIGS. 5 and 6, since the sub-circuit 24 connected to the LD 41 is not soldered to the counterpart sub-circuit 27 (FIG. 1, FIGS. 8 to 10) when the holder 51 including the LD 41 is mounted on the housing 10, the counterpart sub-circuit 27 (FIG. 1, FIGS. 8 to 10) does not block the housing positioning operation of the holder 51 including the LD 41 when the holder 51 including the LD 41 is positioned and mounted on the housing 10 (FIGS. 5, 6). Therefore, manufacturers, etc., of the optical disc apparatus (not shown) can be provided with the optical pickup unit 1 with the holder 51 including the LD 41 securely positioned and mounted on the housing 10.

The optical pickup unit 1 can be mounted on a computer such as a notebook-sized personal computer (not shown), laptop personal computer (not shown), and desktop personal computer (not shown), an audio device such as a CD player, and an audio/visual device (not shown) such as a DVD player, for example. The optical pickup unit 1 is mounted, for example, on an optical disc apparatus no shown, which is incorporated into the above devices.

The optical pickup unit of the present invention is not limited to the shown apparatus. The manufacturing method of the optical pickup unit of the present invention is not limited to the shown method. For example, the present invention may be applied to the optical pickup unit supporting the optical disc of the "Blu-ray Disc". The present invention can be changed variously without departing from the gist thereof.

What is claimed is:

1. An optical pickup unit comprising:
    a light emitting device configured to emit laser light;
    a driver configured to drive the light emitting device;
    a first circuit electrically connected to the light emitting device;
    a second circuit electrically connected to the driver, the second circuit being separated from the first circuit;
    a housing on which the light emitting device is mounted;
    a receiving portion that is formed in the housing and that the light emitting device is receivable into; and
    a connecting portion positioned in the receiving portion at which the light emitting device and the first circuit are electrically connected,
    the first circuit and the second circuit being electrically connected after the light emitting device is received into the receiving portion.

2. The optical pickup unit of claim 1 further comprising:
    a holder configured to house the light emitting device, wherein:
    the holder is receivable into the receiving portion, and
    the first circuit and the second circuit are electrically connected after the holder is received into the receiving portion.

3. The optical pickup unit of claim 2, wherein the holder is received into the receiving portion while allowing the light emitting device to emit the laser light.

4. The optical pickup unit of claim 3, wherein the light emitting device is supplied with electricity from a power supply device connected to the first circuit.

5. An optical pickup unit comprising:
    a light emitting device configured to emit laser light;
    a driver configured to drive the light emitting device;
    a first circuit electrically connected to the light emitting device;
    a second circuit electrically connected to the driver;
    a housing on which the light emitting device is mounted;
    a holder configured to house the light emitting device; and
    a receiving portion formed in the housing that the holder is receivable into,
    the first circuit and the second circuit being electrically connected after the holder is received into the receiving portion while allowing the light emitting device to emit the laser light,
    the light emitting device being supplied with electricity from a power supply device connected to the first circuit,
    the first circuit including a device connecting portion that is electrically connected to the power supply device, and
    the device connecting portion being removed from the first circuit after the holder is received into the receiving portion.

6. The optical pickup unit of claim 5, wherein the first circuit includes a notch portion for facilitating removal of the device connecting portion.

* * * * *